(12) United States Patent
Jeon et al.

(10) Patent No.: US 8,200,234 B2
(45) Date of Patent: Jun. 12, 2012

(54) METHOD AND APPARATUS FOR ALLOCATING RADIO RESOURCE IN WIRELESS SENSOR NETWORK

(75) Inventors: Paul Barom Jeon, Yongin-si (KR); Jun Hyeong Kim, Anyang-si (KR); Sang Do Park, Seoul (KR); Sun Shin An, Seoul (KR); Won Keun Kong, Suwon-si (KR); Chung Gu Kang, Seoul (KR); Sung Min Kang, Seoul (KR); Il Whan Kim, Incheon-si (KR)

(73) Assignees: Samsung Electronics Co., Ltd., Suwon-si (KR); Korea University Industrial and Academic Collaboration Foundation, Seoul (KR)

( * ) Notice: Subject to any disclaimer, the term of this patent is extended or adjusted under 35 U.S.C. 154(b) by 1045 days.

(21) Appl. No.: 11/822,473

(22) Filed: Jul. 6, 2007

(65) Prior Publication Data

US 2008/0188230 A1    Aug. 7, 2008

(30) Foreign Application Priority Data

Feb. 7, 2007    (KR) .................... 10-2007-0012899

(51) Int. Cl.
*H04Q 7/20*    (2006.01)
(52) U.S. Cl. ........................... 455/450; 370/331
(58) Field of Classification Search ............... 455/343.5, 455/450, 444, 574, 509, 513; 370/343, 344, 370/319, 232, 328, 329, 330, 331, 332, 436, 370/437, 464
See application file for complete search history.

(56) References Cited

U.S. PATENT DOCUMENTS

| | | | |
|---|---|---|---|
| 6,967,944 B2 | 11/2005 | Choi | |
| 2003/0063585 A1* | 4/2003 | Younis et al. | 370/331 |
| 2004/0163000 A1 | 8/2004 | Kuhlmann et al. | |
| 2006/0128349 A1* | 6/2006 | Yoon | 455/343.2 |
| 2007/0019569 A1* | 1/2007 | Park et al. | 370/254 |
| 2009/0061774 A1* | 3/2009 | Larsson et al. | 455/41.2 |

FOREIGN PATENT DOCUMENTS

| | | |
|---|---|---|
| KR | 10-2005-0072958 | 7/2005 |
| KR | 10-2006-0070324 | 6/2006 |
| KR | 10-2006-0084052 | 7/2006 |
| KR | 10-2006-0099470 | 9/2006 |

* cited by examiner

*Primary Examiner* — Dwayne Bost
*Assistant Examiner* — Myron Wyche
(74) *Attorney, Agent, or Firm* — NSIP Law (57) ABSTRACT

A method and apparatus for allocating a radio resource in a wireless sensor network are provided, in which a signal requesting a radio resource allocation is received from any one of sensors included in the wireless sensor network, an amount of remaining energy is compared with respect to each zone where a sensor transmitting the signal is included, an order of zones, from a zone comprising a greatest amount of remaining energy to a zone having a least amount of remaining energy, is determined as a result of the comparison, and a time slot is allocated to a sensor of each zone according to the determined order of zones, when transmitting a frame for the radio resource allocation.

21 Claims, 11 Drawing Sheets

METHOD AND APPARATUS FOR ALLOCATING RADIO RESOURCE IN WIRELESS SENSOR NETWORK

CROSS-REFERENCE TO RELATED APPLICATIONS

This application claims the benefit under 35 U.S.C. §119 (a) of a Korean Patent Application No. 10-2007-0012899, filed on Feb. 7, 2007, in the Korean Intellectual Property Office, the entire disclosure of which is hereby incorporated by reference.

BACKGROUND OF THE INVENTION

1. Field of the Invention

The present invention relates to a wireless sensor network system. More particularly, the present invention relates to a method and apparatus for allocating a radio resource in a wireless sensor network.

2. Description of Related Art

Wireless sensor networks refer to wireless mesh networks including several tens through several thousands of sensor nodes which may be referred to as sensors. In wireless sensor networks, nodes may communicate with each other using radio frequencies (RFs) to sense physical or environmental conditions.

Also, in wireless sensor network systems, since energy efficiency of sensors is critical, two methods have been proposed in a conventional art to improve the energy efficiency.

First, as an example of the conventional art, sleep cycles of an individual sensor are controlled in a distributed way or centrally controlled by coordinators. Accordingly, when necessary, selected sensors are controlled at selected times to wake up from a sleep state.

Second, as another example of the conventional art, a scheme using data reduction exists. In such a scheme, representative nodes for transmitting data are selected and data is collected.

However, the conventional art described above has the following disadvantages.

According to the first example of the conventional art, network throughput and data transmission delay may not be considered, since the goal is for support to match sleep cycles of a source node and a destination node. Specifically, although energy efficiencies may be improved, network throughput and data transmission delay may not be improved.

According to the second example of the conventional art, an assumption that all sensors included in a particular zone accurately sense a same event at the same time is required. Accordingly, when sensing data information of each sensor is not identical, or collecting all data generated in a particular zone is unnecessary, an application may be meaningless.

Also, according to the first example and the second example, lifetimes of the networks may not be extended.

Accordingly, there is a need for an improved method and apparatus for allocating a radio resource in a wireless sensor network.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a method and apparatus for allocating a radio resource in a wireless sensor network which may greatly extend a lifetime of a wireless sensor network by introducing a new scheduling method.

An aspect of exemplary embodiments of the present invention also provides a method and apparatus for allocating a radio resource in a wireless sensor network which may optimally maintain a lifetime of a wireless sensor network without adversely affecting a network throughput and data transmission delay.

An aspect of exemplary embodiments of the present invention also provides a method and apparatus for allocating a radio resource in a wireless sensor network which may greatly extend a lifetime of a wireless sensor network when sensing data information of each node is not identical, or collecting data generated in a particular zone is unnecessary.

According to an aspect of exemplary embodiments of the present invention, a method of allocating a radio resource in a wireless sensor network is provided, in which a signal requesting a radio resource allocation is received from any one of sensors included in the wireless sensor network, an amount of remaining energy is compared with respect to each zone where a sensor transmitting the signal is included, an order of zones is determined, from a zone having a greatest amount of remaining energy to a zone having a least amount of remaining energy, as a result of the comparison, and a time slot is allocated to a sensor of each zone according to the determined order, when transmitting a frame for the radio resource allocation.

According to another aspect of exemplary embodiments of the present invention, an apparatus for allocating a radio resource in a wireless sensor network is provided, in which a receiving unit receives a signal requesting a radio resource allocation from any one of sensors included in the wireless sensor network, a comparison unit compares an amount of remaining energy with respect to each zone including a sensor which transmits the signal, a determination unit determines an order of zones, from a zone having a greatest amount of remaining energy to a zone having a least amount of remaining energy, as a result of the comparison, and an allocation unit allocates a time slot to a sensor of each zone according to the determined order, when transmitting a frame for the radio resource allocation.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain exemplary embodiments of the present invention will be more apparent from the following detailed description, taken in conjunction with the accompanying drawings in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
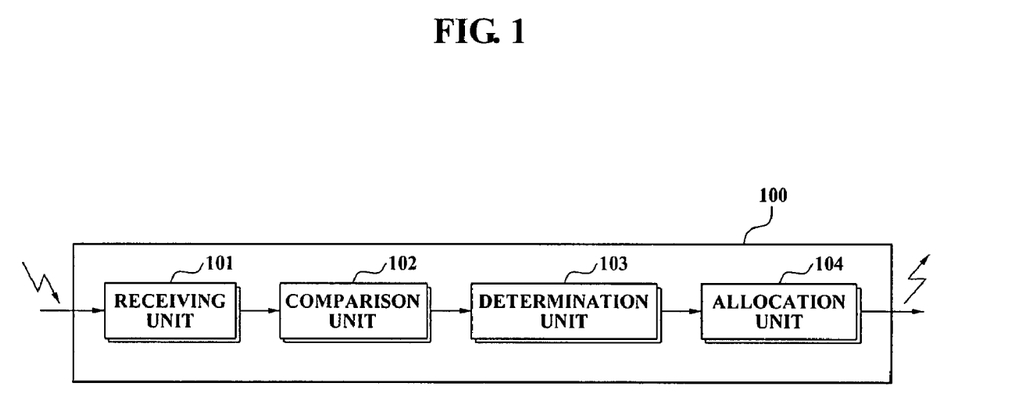
FIG. 1 is a block diagram illustrating a configuration of an apparatus for allocating a radio resource in a wireless sensor network according to an exemplary embodiment of the present invention.
Figure 2:
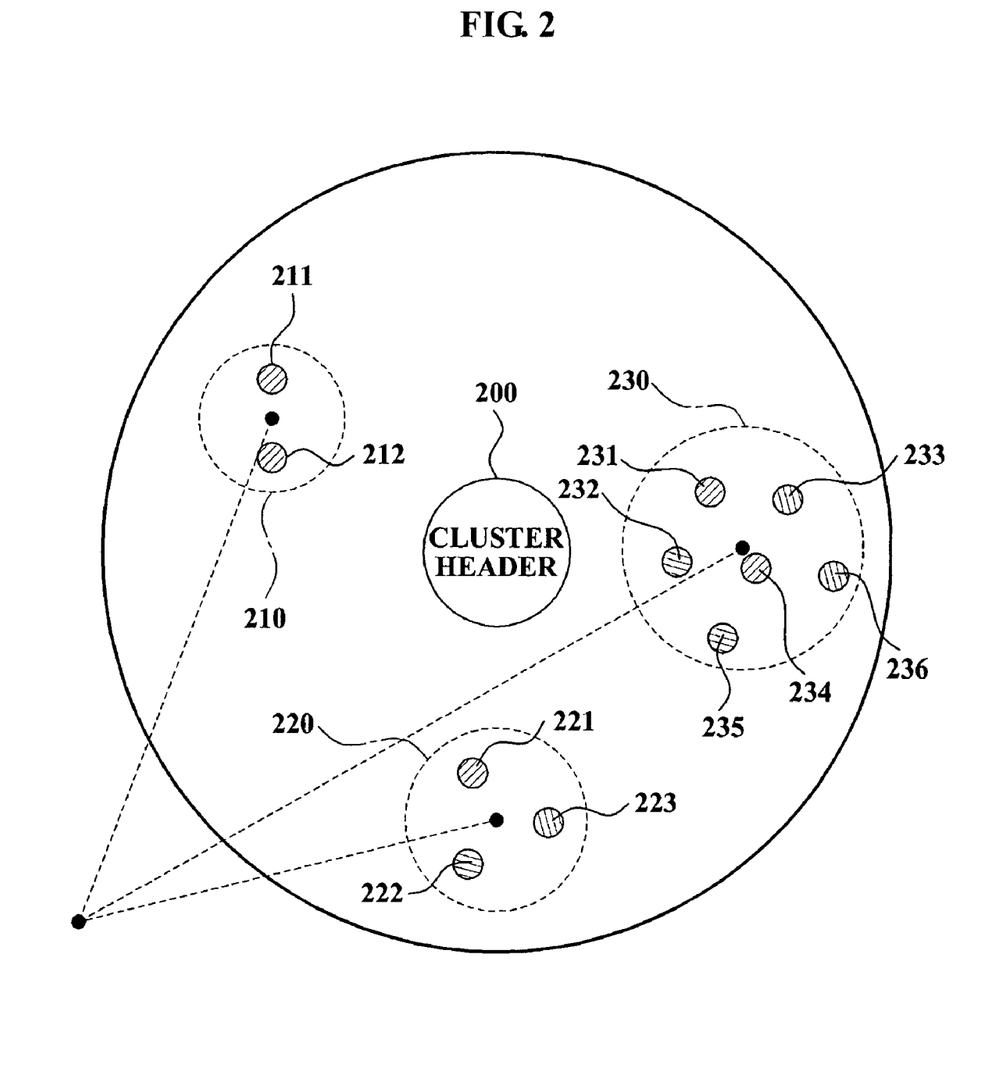
FIG. 2 is a diagram illustrating an example of a configuration of a wireless sensor network according to an exemplary embodiment of the present invention.

FIG. 1 is a block diagram illustrating a configuration of an apparatus for allocating a radio resource in a wireless sensor network according to an exemplary embodiment of the present invention. FIG. 2 is a diagram illustrating an example of a configuration of a wireless sensor network according to an exemplary embodiment of the present invention. Hereinafter, referring to FIGS. 1 and 2, the apparatus for allocating a radio resource in a wireless sensor network according to an exemplary embodiment of the present invention is described.

As illustrated in FIG. 2, for example, the configuration of the apparatus for allocating a radio resource in a wireless sensor network may be a wireless sensor network using a centralized media access control (MAC) method. The wireless sensor network may be a network which may use location information such as Global Positioning System (GPS) information and GeoGraphic Code (GGC) information. Specifically, for example, the apparatus for allocating a radio resource in a wireless sensor network may be applicable to an Institute of Electrical and Electronics Engineers (IEEE) 802.15-based sensor network. However, the present invention is not limited to the above-described examples. Also, the present invention may be applicable to every wireless sensor network using the centralized MAC method.

As an example illustrated in FIG. 2, the wireless sensor network includes a cluster header 200, a first zone 210, a second zone 220, and a third zone 230. Each of the first zone 210, the second zone 220, and the third zone 230 may include at least one sensor node, hereinafter, a sensor, 211, 212, 221, 222, 223, 231, 232, 233, 234, 235, and 236. The cluster header 200 may recognize absolute or relative location information of all sensors, 211, 212, 221, 222, 223, 231, 232, 233, 234, 235, and 236, in a zone, which is controlled by the cluster header 200, by using the GPS information and the GGC information. The cluster header 200 groups a plurality of sensors, 211, 212, 221, 222, 223, 231, 232, 233, 234, 235, and 236, according to a predetermined purpose using the recognized location information. Also, the cluster header 200 collects location information of the grouped sensors, and defines a particular zone which is newly formed by the grouped sensors. FIG. 2 illustrates a zone which is formed by using a GGC code.

FIG. 1 illustrates the cluster header 200 in greater detail. Specifically, the apparatus for allocating a radio resource in a wireless sensor network 100 according to an exemplary embodiment of the present invention may be embodied via the cluster header 200.

As illustrated in FIG. 1, the apparatus for allocating a radio resource in a wireless sensor network 100 includes a receiving unit 101, a comparison unit 102, a determination unit 103, an allocation unit 104, and the like. For reference, in FIG. 1, other components are omitted. However, although the configuration of the apparatus for allocating a radio resource in a wireless sensor network 100 according to an exemplary embodiment of the present invention is mainly illustrated, the present invention may be easily understood by those skilled in the related art with reference to the present specification. Also, the receiving unit 101, the comparison unit 102, the determination unit 103, the allocation unit 104, and the like may be embodied as software or hardware such as a chip or a module.

The receiving unit 101 receives a signal requesting a radio resource allocation from a random sensor among at least one sensor included in the wireless sensor network. The comparison unit 102 compares an amount of remaining energy with respect to each zone including the sensor which transmits the signal, as described in more detail below. The determination unit 103 determines an order of zones, from a zone having a greatest amount of remaining energy to a zone having a least amount of remaining energy, as a result of the comparing. The allocation unit 104 allocates a time slot to a sensor of each zone according to the determined order, when transmitting a frame for the radio resource allocation.

When two sensors are included in a same zone, the comparison unit 102 compares an amount of remaining energy of the two sensors. Also, the determination unit 103 determines an order of sensors, from a sensor having a greatest amount of remaining energy to a sensor having a least amount of remaining energy, as a result of the comparing. The allocation unit 104 allocates the time slot to the random sensor by considering the determined order with respect to the zones and the sensors.

As an example, when a wireless sensor network system is initially provided, remaining energy of each of the first zone 210, the second zone 220, and the third zone 230 may be identical. However, the remaining energy may vary depending on a communication frequency, a number of packets, and the like. In the communication frequency, the communication is between the cluster header 200 and the sensors 211, 212, 221, 222, 223, 231, 232, 233, 234, 235, and 236 included in the first zone 210, the second zone 220, and the third zone 230. In an exemplary implementation, the cluster header 200 may calculate information about the remaining energy by using information which is recognized as a default, by using information about a number of communications with each of the first zone 210, the second zone 220, and the third zone 230 or the number of packets, or by individually communicating with the sensors, 211, 212, 221, 222, 223, 231, 232, 233, 234, 235, and 236. Also, the cluster header 200 allocates a radio resource to the sensor having the greatest amount of remaining energy of the zone having the greatest amount of remaining energy by using the calculated value.

As described above, a lifetime of the wireless sensor network may be extended by determining an allocation order of the radio resource. In a conventional art, a scheduling concept described above was not introduced, which causes a few disadvantages. A reason why the order from the sensor having the greatest amount of remaining energy of the zone having the greatest amount of remaining energy is determined is described in more detail later.

Figure 3:
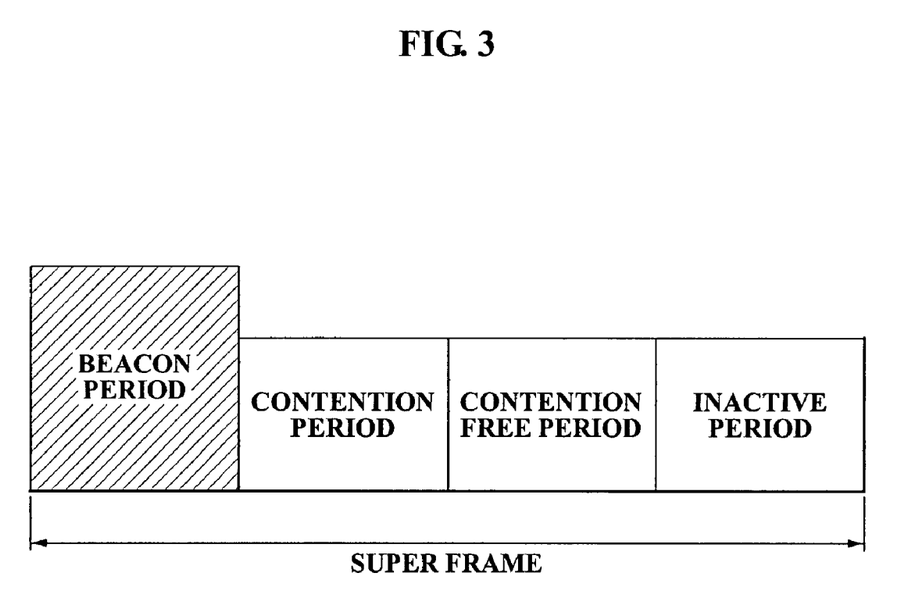
FIG. 3 is a diagram illustrating an example of a frame of a wireless sensor network according to an exemplary embodiment of the present invention.

FIG. 3 is a diagram illustrating an example of a frame of a wireless sensor network according to an exemplary embodiment of the present invention. Hereinafter, referring to FIG. 3, the frame of the wireless sensor network according to an exemplary embodiment of the present invention is described.

An apparatus for allocating a radio resource in a wireless sensor network according to an exemplary embodiment of the present invention, for example, the cluster header manages a multiplexed frame in a zone, which is controlled by the cluster header, and a radio resource for communicating with each sensor. As an example, the multiplexed frame may refer to a frame multiplexed by a time division multiple access (TDMA) scheme, a carrier sensing multiple access with collision avoidance (CSMA-CA) scheme, and the like. The configuration of the frame is illustrated as illustrated in FIG. 3.

As illustrated in FIG. 3, when the cluster header transmits data to a sensor, a beacon period is used. When the sensor transmits the data to the cluster header, a contention period and a contention free period may be used. Specifically, the contention period is used as a period where a sensor sensing an event requests a resource allocation. In the contention free period, sensors actually transmit the data. An inactive period refers to a period where no communication event is generated.

As described above, in an exemplary implementation, the cluster header first allocates a time slot of the frame to a sensor having a greatest amount of remaining energy of a zone having a greatest amount of remaining energy, by referring to information via the contention period and the contention free period.

Hereinafter, more specifically, a concept of a lifetime of the wireless sensor network and an ideal case where the wireless sensor network has a maximal lifetime are described in detail.

When setting the lifetime of the wireless sensor network of a zone i at a time t as $L_i(t)$, a total lifetime of wireless sensor network, $(L(t))$ is set as a minimal $L_i(t)$ value, which is represented as, $$L(t) = \min(L_1(t), L_2(t), L_3(t), \ldots L_N(t)) \quad \text{[Equation 1]}$$

Specifically, the lifetime of the wireless sensor network, which is set as a total N number of zones, is determined by a zone having a shortest average lifetime, since a point in time when data is no longer collected is a point in time when the total lifetime of the wireless sensor network ends.

The lifetime of the zone i, $L_i(t)$ is consequently proportional to an average remaining energy $E_i(t)$ of sensors in a zone, which is represented as, $$L_i(t) \approx k_i \cdot E_i(t) \text{ where } E_i(t) = \frac{1}{M_i} \sum_{j=1}^{M_i} \varepsilon_{i,j}(t). \quad \text{[Equation 2]}$$

Here, $k_i$ is a proportional constant (Second/Jule) to correct and convert a power consumption amount of a data transmission state, a data receipt state, and a data idle state into a time. The energy consumption of the data transmission state, the data receipt state, and the data idle state are different for each zone. $\varepsilon_{i,j}(t)$ is an amount of remaining energy of a $j^{th}$ sensor of the zone i. $M_i$ is a number of sensors of the zone i.

The $\varepsilon_{i,j}(t)$ at the time t is represented as, $$\varepsilon_{i,j}(t) \approx E_{max} - \alpha_{i,j}(t)E_T - \beta_{i,j}(t)E_R - \gamma_{i,j}(t)E_I \text{ where}$$

$$\alpha_{i,j}(t) + \beta_{i,j}(t) + \gamma_{i,j}(t) = t. \quad \text{[Equation 3]}$$

Here, $\alpha_{i,j}(t)$ refers to a time amount which is allocated to the $j^{th}$ sensor of the zone i from 0 to the time t for a data transmission. $\beta_{i,j}(t)$ refers to a time amount which is allocated to the $j^{th}$ sensor of the zone i from 0 to the time t for a data reception. $\gamma_{i,j}(t)$ refers to a time amount where the $j^{th}$ sensor of the zone i from 0 to the time t maintains the idle state. $E_{max}$ refers to a maximum energy as an initial energy of a sensor. $E_T$ refers to a power consumption amount of the data transmission state, $E_R$ refers to a power consumption amount of the data receipt state, and $E_I$ refers to a power consumption amount of the idle state.

Equation 2 and Equation 3 are combined, which is given by, $$E_i(t) = \frac{1}{M_i} \sum_{j=1}^{M_i} \varepsilon_{i,j}(t) = \quad \text{[Equation 4]}$$

$$\frac{1}{M_i} \cdot \sum_{j=1}^{M_i} (E_{max} - \alpha_{i,j}(t)E_T - \beta_{i,j}(t)E_R - \gamma_{i,j}(t)E_I) =$$

$$E_{max} - \overline{\alpha}_i(t)E_T - \overline{\beta}_i(t)E_R - \overline{\gamma}_i(t)E_I$$

where $$\overline{\alpha}_i(t) = \frac{1}{M_i} \cdot \sum_{j=1}^{M_i} \alpha_{i,j}(t)$$

$$\overline{\beta}_i(t) = \frac{1}{M_i} \cdot \sum_{j=1}^{M_i} \beta_{i,j}(t)$$

$$\overline{\gamma}_i(t) = \frac{1}{M_i} \cdot \sum_{j=1}^{M_i} \gamma_{i,j}(t),$$

$L_i(t)$ is represented as, $$L_i(t) \approx k_i \cdot E_i(t) = k_i \cdot (E_{max} - \overline{\alpha}_i(t)E_T - \overline{\beta}_i(t)E_R - \overline{\gamma}_i(t)E_I) \quad \text{[Equation 5]}$$

In a network which is configured to monitor a particular phenomenon, data is generated at an equal frequency in each zone. In this case, $k_i$ has a same value in all zones. Accordingly, an objective function which may optimally extend the lifetime of the wireless sensor network is represented as, $$\max_{\overline{\alpha}_1(t),\ldots\overline{\alpha}_N(t),\overline{\beta}_1(t),\ldots\overline{\beta}_N(t),\overline{\gamma}_1(t),\ldots\overline{\gamma}_N(t)} L = \quad \text{[Equation 6]}$$

$$\max(\min(L_1, L_2, \ldots L_N)).$$

Specifically, extending the lifetime of the wireless sensor network corresponds to a type of combination being used for allocating a radio resource when allocating the radio resource to a plurality of zones.

As described above, when using the frame illustrated in FIG. 3, each sensor receives the data in a beacon period. Specifically, $\overline{\beta}_i(t)$ may be considered as a total sum of the beacon period. A message of the beacon period is received by all sensors at all times since allocation information of the frame and network parameter information are transmitted. Accordingly, all sensors have an identical $\overline{\beta}_i(t)$ (($\overline{\beta}_i(t) = \beta(t)$)). Also, since $\overline{\gamma}_i(t) = t - \overline{\alpha}_i(t) - \beta(t)$ is given, Equation 5 is arranged as, $$L_i = E_{max} - \overline{\alpha}_i(t)(E_T - E_I) - \beta(t)(E_R - E_I) - tE_I. \quad \text{[Equation 7]}$$

When setting a zone having the minimal $L_i$ as i*, $L = L_{i^*}$ with respect to the total lifetime of the wireless sensor network is given. Also, the total lifetime of the wireless sensor network is given by, $$i^* = \operatorname*{argmax}_{\forall i}(\overline{\alpha}_i(t)(E_T - E_I)) \approx \operatorname*{argmax}_{\forall i} \overline{\alpha}_i(t). \quad \text{[Equation 8]}$$

Specifically, the total lifetime of the wireless sensor network is identical to a lifetime of a zone having a greatest $\overline{\alpha}_i(t)$ value. Through this, it may be ascertained that the lifetime of the wireless sensor network is determined by a zone having a high average allocation frequency of sensors from among the plurality of zones. However, the average allocation frequency may refer to an average allocation frequency of a time slot of the frame. Accordingly, to optimally extend the lifetime of the wireless sensor network, a zone where a greatest amount of radio resource are allocated, $\overline{\alpha}_i^*(t)$ should be minimized, which is represented as, $$\max_{\overline{\alpha}_1(t),\ldots\overline{\alpha}_N(t)} L = \min \overline{\alpha}_{i^*}(t). \quad \text{[Equation 9]}$$

When setting a total amount of resource, which is allocated to the sensor for the data transmission, to the time t as $C(t)$, $C(t)$ is given by, $$\sum_{i=1}^{N} \overline{\alpha}_i(t) = C(t). \quad \text{[Equation 10]}$$

Further, when "$\overline{\alpha}_i^*(t) \geq \overline{\alpha}_j(t)\ 1 \leq j \leq N, j \neq i^*$" is satisfied, the following Equation 11 and Equation 12 are satisfied $$\sum_{i=1}^{N} \overline{\alpha}_i(t) = C(t) \leq \sum_{i=1}^{N} \overline{\alpha}_{i^*}(t) = N \cdot \overline{\alpha}_{i^*}(t), \quad \text{[Equation 11]}$$

$$\frac{C(t)}{N} \leq \overline{\alpha}_{i^*}(t). \quad \text{[Equation 12]}$$

From Equation 12, a condition to optimally extend the lifetime of the wireless sensor network is represented as, $$\min \overline{\alpha}_{i^*}(t) = \frac{C(t)}{N}. \quad \text{[Equation 13]}$$

Accordingly, when a resource of $C(t)/N$ is allocated to all sensors included in the N number of zones, regardless of a zone where a corresponding sensor is included, the lifetime of the wireless sensor network is optimally extended. Thus, in a viewpoint of energy, when remaining energy is identical in all zones, the lifetime of the wireless sensor network is optimally extended. When converting Equation 13 to reflect the viewpoint of energy, Equation 13 is represented as, $$E_{i^*}(t) = E_{max} - \frac{C(t)}{N}(E_T - E_I) - \beta(t)(E_R - E_I) - tE_I = \quad \text{[Equation 14]}$$

$$E_j(t),$$

where $$1 \leq j \leq N, j \neq i^*.$$

In Equations 1 through 14, it is provided that the lifetime of the wireless sensor network is extended when the remaining energy of the sensors included in all zones of the wireless sensor network is identical. However, in an exemplary implementation, the ideal case is assumed, and thus, it should be considered that all the sensors realistically do not have data to be transmitted at every scheduling period in the wireless sensor network, and an amount of resource to be distributed, for example, the radio resource amount, is also limited.

Specifically, Equation 14 may be applied to when all sensors have data to be transmitted and a resource which transmits all data in a single scheduling period exists. In a real communication environment, only sensors having data to be transmitted in a scheduling period is an object of scheduling. Also, since the resource may not be allocated to all sensors in the single scheduling period, Equation 14 is arranged as, $$E_1(t) \cdot I_1(n \cdot T) \cong \ldots \cong E_N(t) \cdot I_N(n \cdot T) \text{ where } 0 < n, 0 < T. \quad \text{[Equation 15]}$$

Here, T is a scheduling period, and identical to a period of a superframe or a transmission period of a beacon message illustrated in FIG. 3. $I_1(n \cdot T)$ is an indicator function, and a value indicating whether the resource is allocated to a corresponding zone in an $n^{th}$ frame, which is represented as, $$I_N(n \cdot T) = \begin{cases} 1, & \text{If Allocated} \\ 0, & O \cdot W. \end{cases} \quad \text{[Equation 16]}$$

Here, determining $I_N(n \cdot T)$ is related to allocating the resource of the $n_{th}$ frame to which zone and which sensor, and should satisfy Equation 15. Specifically, a scheme according to an exemplary embodiment of the present invention satisfies Equation 15 by first allocating the time slot to the sensor having the greatest amount of remaining energy, that is, a small amount of wasted energy, when transmitting the frame. For this, the zone having the greatest amount of remaining energy and the sensor having the greatest amount of remaining energy should be detected from the zone having the greatest amount of remaining energy, which is given by, $$i^* = \underset{\forall i}{\operatorname{argmax}}\left(\frac{1}{E_{max} - E_i(t)}\right)$$ [Equation 17]

and $$j^* = \underset{\forall j}{\operatorname{argmax}}\left(\frac{1}{E_{max} - \varepsilon_{i^*,j}(t)}\right)$$

$$1 \le i \le N, 1 \le j \le M_{i^*}$$

However i* refers to the zone having the greatest amount of remaining energy, and j* refers to the sensor having the greatest amount of remaining energy of an $M_i^*$ number of sensors included in the zone i*. j refers to an index of a time slot and k refers to an index of the frame. N(k) refers to a number of time slots of a $k^{th}$ frame.

Figure 4:
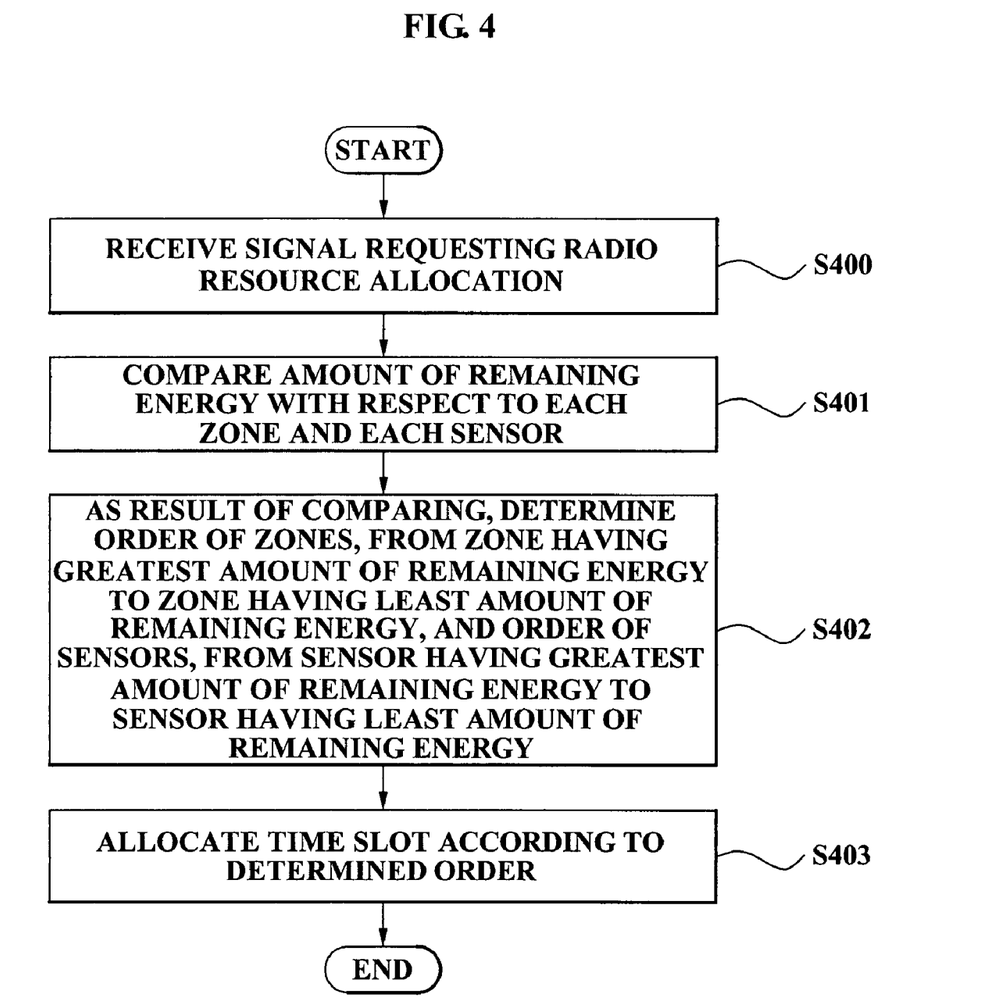
FIG. 4 is a flowchart illustrating an example of a method of allocating a radio resource in a wireless sensor network according to an exemplary embodiment of the present invention.

FIG. 4 is a flowchart illustrating an example of a method of allocating a radio resource in a wireless sensor network according to an exemplary embodiment of the present invention. Hereinafter, referring to FIG. 4, the example of a method of allocating a radio resource in a wireless sensor network according to an exemplary embodiment of the present invention is described. FIG. 4 illustrates a description of the above-described FIGS. 1 through 3 and Equations 1 through 17 in a time series. Accordingly, although the flowchart is not described in detail, it may be easily understood by those skilled in the related art.

In step S400, a cluster header, and the like, of the wireless sensor network receives a signal requesting a radio resource allocation from any one of the sensors included in the wireless sensor network. In step S401, the cluster header compares an amount of remaining energy with respect to each zone and each sensor. In step S402, the cluster header determines an order of zones, from a zone having a greatest amount of remaining energy to a zone having a least amount of remaining energy, as a result of the comparison. When at least two sensors are included in a same zone, the cluster header determines an order of sensors, from a sensor having a greatest amount of remaining energy to a sensor having a least amount of remaining energy. In step S403, a time slot is allocated to each sensor according to the determined order, when transmitting a frame for the radio resource allocation.

Figure 5:
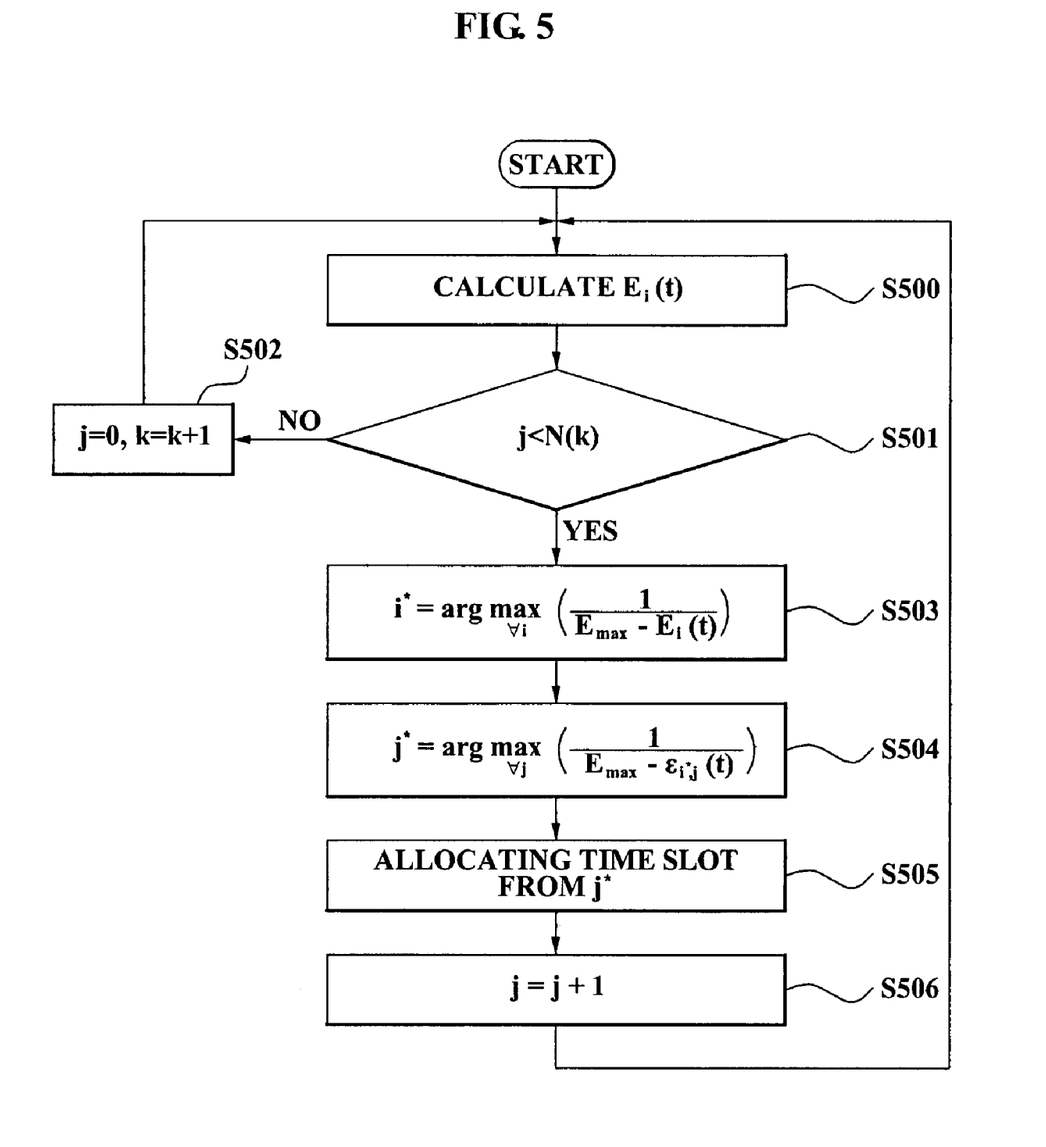
FIG. 5 is a flowchart illustrating another example of a method of allocating a radio resource in a wireless sensor network according to an exemplary embodiment of the present invention.

FIG. 5 is a flowchart illustrating another example of a method of allocating a radio resource in a wireless sensor network according to an exemplary embodiment of the present invention. Hereinafter, referring to FIG. 5, the other example of a method of allocating a radio resource in a wireless sensor network according to an exemplary embodiment of the present invention is described in detail. Specifically, an exemplary embodiment of the present invention according to Equations 15 through 17 is described.

In step S500, $E_i(t)$ is calculated. In step S501, whether a number of slots of a $k_{th}$ frame, (N(k)) is greater than an index value of a random slot is determined. As a result of the determination in step S501, when the (N(k)) is not greater than the index value of the random slot, step S502 of setting the index value of the random slot to zero and incrementing the frame by one, and step S500 are performed. As a result of the determining in step S501, when the (N(k)) is greater than the index value of the random slot, a zone i* is selected. The zone i* is the zone having the greatest amount of remaining energy of an N number of zones included in the wireless sensor network in step S503. In step S504, a sensor j* is selected. The j* is a sensor, having the greatest amount of remaining energy, that is, a least amount of consumption energy, of an $M_i^*$ number of sensors included in the selected zone. In step S505, a time slot is first allocated to the sensor j* when transmitting the frame. Accordingly, after selecting the zone having the greatest amount of remaining energy, that is, a zone having the least amount of wasted energy, the time slot is allocated to the sensor having the greatest amount of remaining energy, that is, the sensor having the least amount of wasted energy, in the selected zone. Thus, an energy consumption deviation for each sensor may be reduced, and the total lifetime of the wireless sensor network may be greatly extended. Finally, in step S506, the index value of the random slot is incremented by one.

Figure 6A:
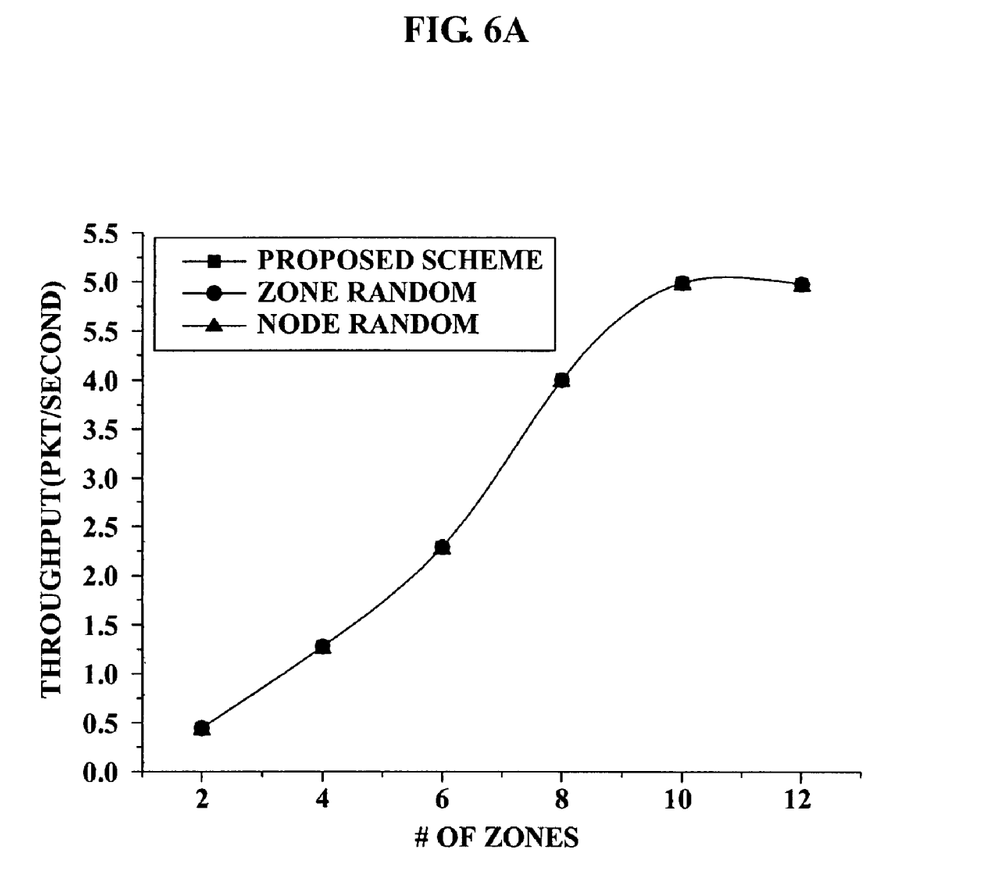
FIG. 6A is a graph illustrating a throughput of a method and apparatus for allocating a radio resource in a wireless sensor network according to an exemplary embodiment of the present invention.
Figure 6B:
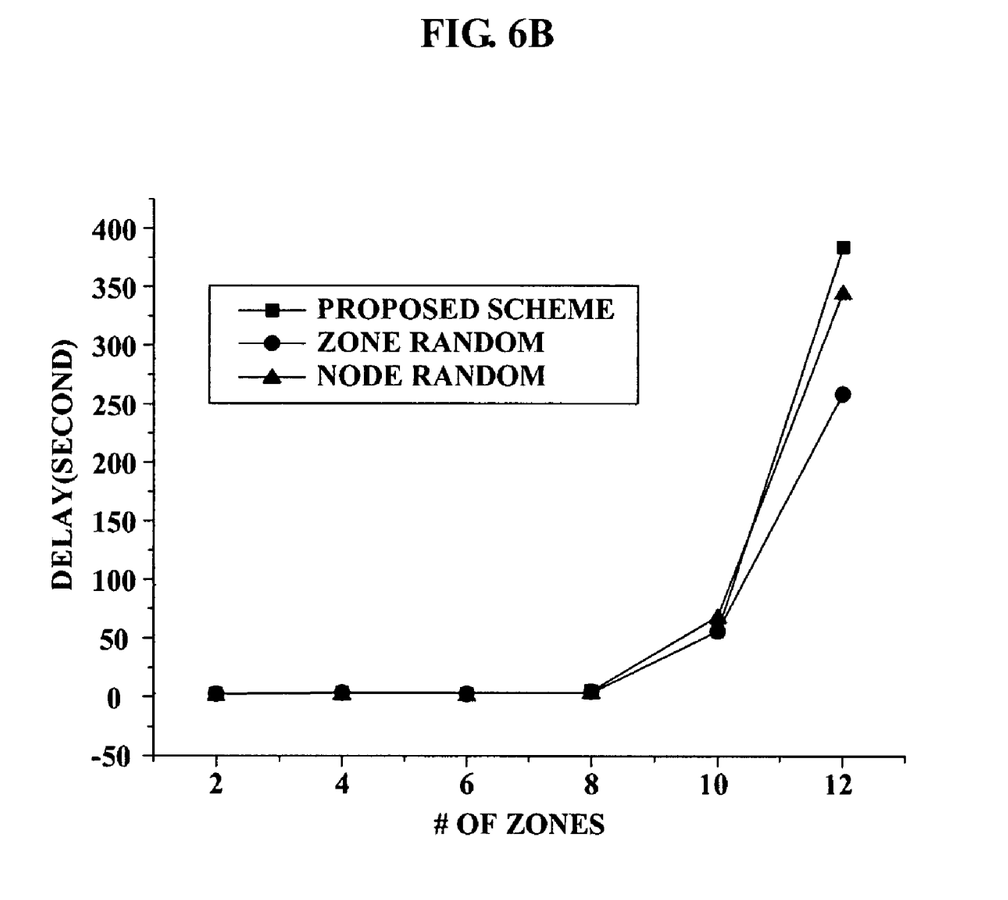
FIG. 6B is a graph illustrating a delay of a method and apparatus for allocating a radio resource in a wireless sensor network according to an exemplary embodiment of the present invention.
Figure 6C:
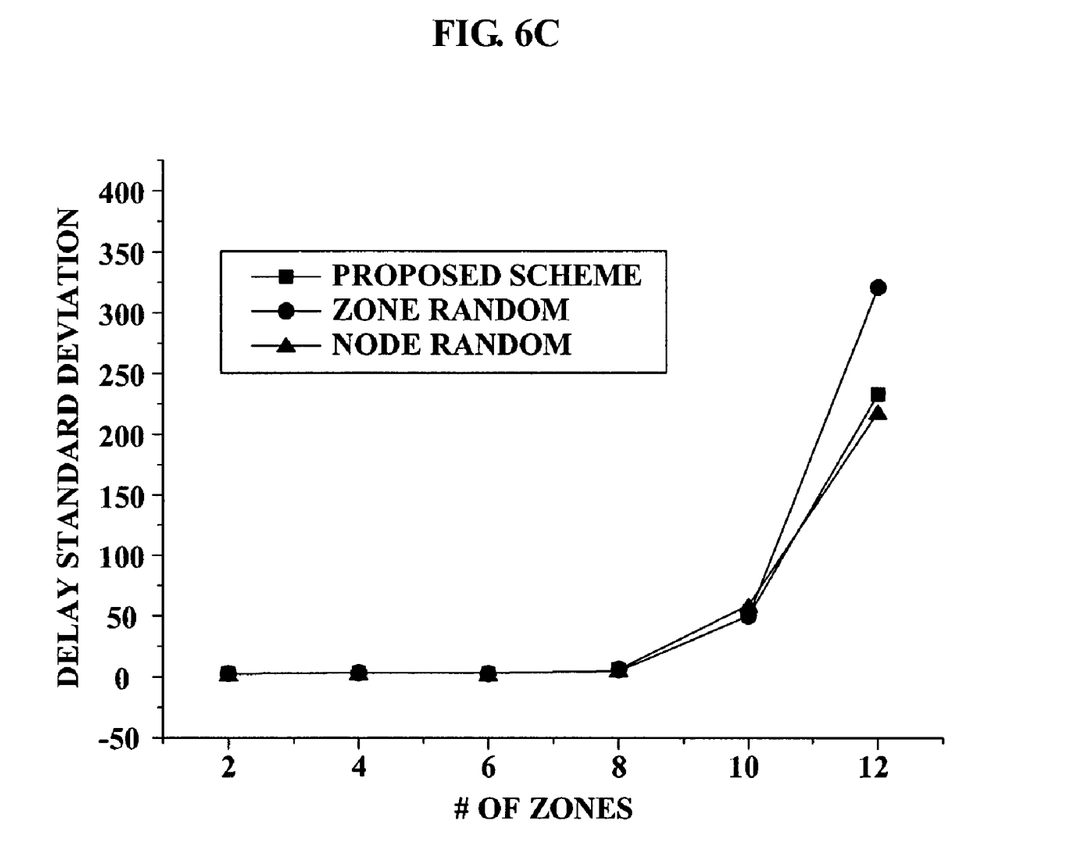
FIG. 6C is a graph illustrating a delay standard deviation of a method and apparatus for allocating a radio resource in a wireless sensor network according to an exemplary embodiment of the present invention.

FIG. 6A is a graph illustrating a throughput of a method and apparatus for allocating a radio resource in a wireless sensor network according to an exemplary embodiment of the present invention. FIG. 6B is a graph illustrating a delay of a method and apparatus for allocating a radio resource in a wireless sensor network according to an exemplary embodiment of the present invention. FIG. 6C is a graph illustrating a delay standard deviation of a method and apparatus for allocating a radio resource in a wireless sensor network according to an exemplary embodiment of the present invention. Hereinafter, referring to FIGS. 6A, 6B, and 6C, it is described that the method and apparatus for allocating a radio resource in a wireless sensor network according to an exemplary embodiment of the present invention has no tradeoff in terms of the throughput, the delay, and the delay standard deviation in comparison to a conventional art.

Experimental results illustrated in FIGS. 6A through 9 are obtained by an objective simulator. It is assumed that a single cluster header controls a variable number of zones, for example, two, four, six, eight, or ten number of zones, and one, two, three, or five number of sensors for each zone are distributed. An event is generated in a Poisson distribution in each of the zones once every five seconds on average. Also, only sensors included in a same zone sense the event at a corresponding time. Also, it is assumed that the cluster header uses a frame illustrated in FIG. 3, a length of the frame is two seconds, a channel is a wireless channel of 100 Kbps. The frame is referred to as a superframe. In the superframe, a beacon period is fixed as four slots, and a contention free period is fixed as ten or seven slots. It is assumed that a single data packet is transmitted at every slot. A length of a single slot is set as 2.56 ms. Also, it is assumed that a contention period is fixed as 500 ms and a contention of all sensors in a corresponding period is generated without a collision. A remaining period is set as an inactive period. However, values described above are merely examples, and other values may be used depending on an experimental environment.

To compare a scheduling method according to an exemplary embodiment of the present invention, two methods are set. A first method is a zone random method. The first method randomly selects a zone including traffic at every scheduling unit and allocates a radio resource to all sensors included in the zone. A second method is a node random method. The second method randomly selects a sensor including the traffic at every scheduling unit and allocates the radio resource to the sensor. The two methods select each zone or each sensor in a same probability.

FIGS. 6A, 6B, and 6C illustrate the throughput, the delay, and the delay standard deviation which vary according to a change of a number of zones, when 10 slots in a frame of 2 ms are allocated as the contention free period. As illustrated in FIGS. 6A, 6B, and 6C, a scheme according to the present invention, the zone random method, and the node random method generate a same result.

A wireless sensor network environment considered in the present experiment includes sensors in a uniform distribution. Also, traffic is shown in a uniform distribution. Since a communication of a contention period which is consumed for a resource allocation request is ideally considered, a control overhead for a scheduling is identical. Accordingly, a scheduler allocates a radio resource for data generated in a same distribution.

In an exemplary implementation, when the wireless sensor network is not saturated, a difference of the throughput and delay does not exist since the resource allocation for the generated data is performed at all times. Also, since the wireless sensor network is saturated in a same situation, that is, ten zones, due to a relatively long inactive period, a saturation point in time of the throughput is also identical. Also, since a number of packets collected by the cluster header is identical regardless of the scheduling method, an amount of consumed energy is identical. Accordingly, as illustrated in FIGS. 6A, 6B, and 6C, the scheme according to an exemplary embodiment of the present invention may not deteriorate the throughput and delay in comparison to the conventional art. An experimental result that a lifetime of the wireless sensor network increases is described in detail with reference to FIGS. 7, 8, and 9.

Figure 7:
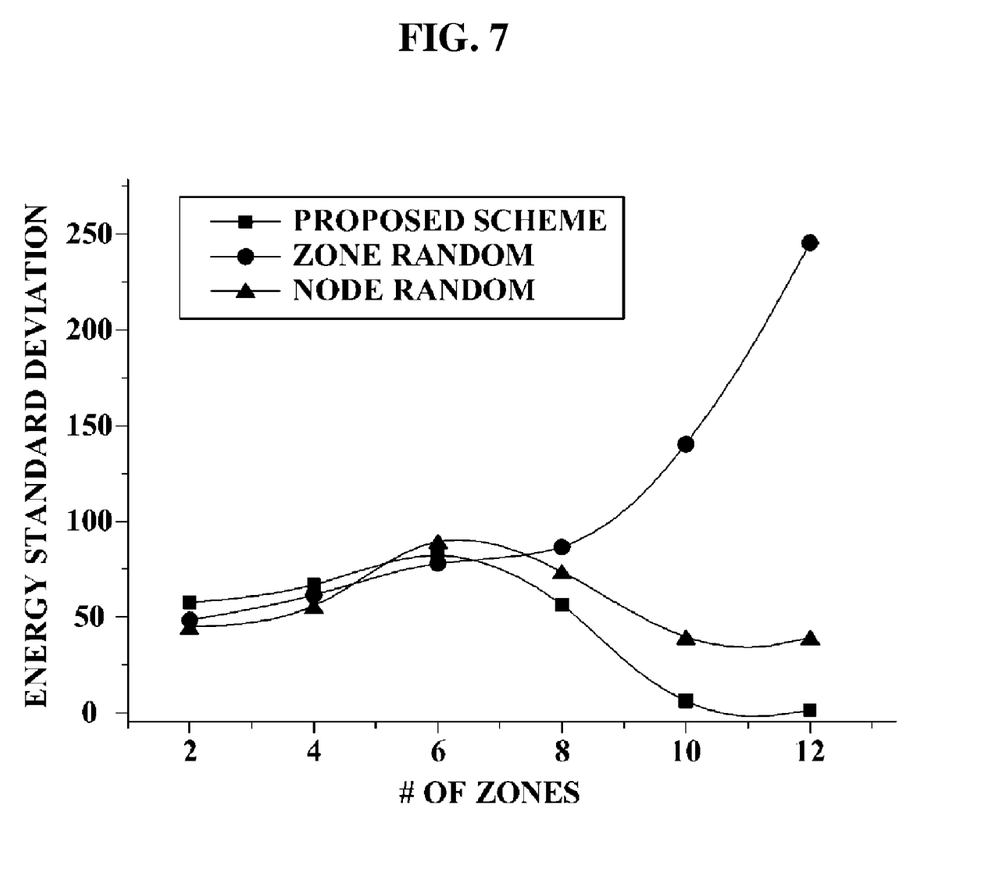
FIG. 7 is a graph illustrating an example of an energy standard deviation of a method and apparatus for allocating a radio resource in a wireless sensor network according to an exemplary embodiment of the present invention.
Figure 8:
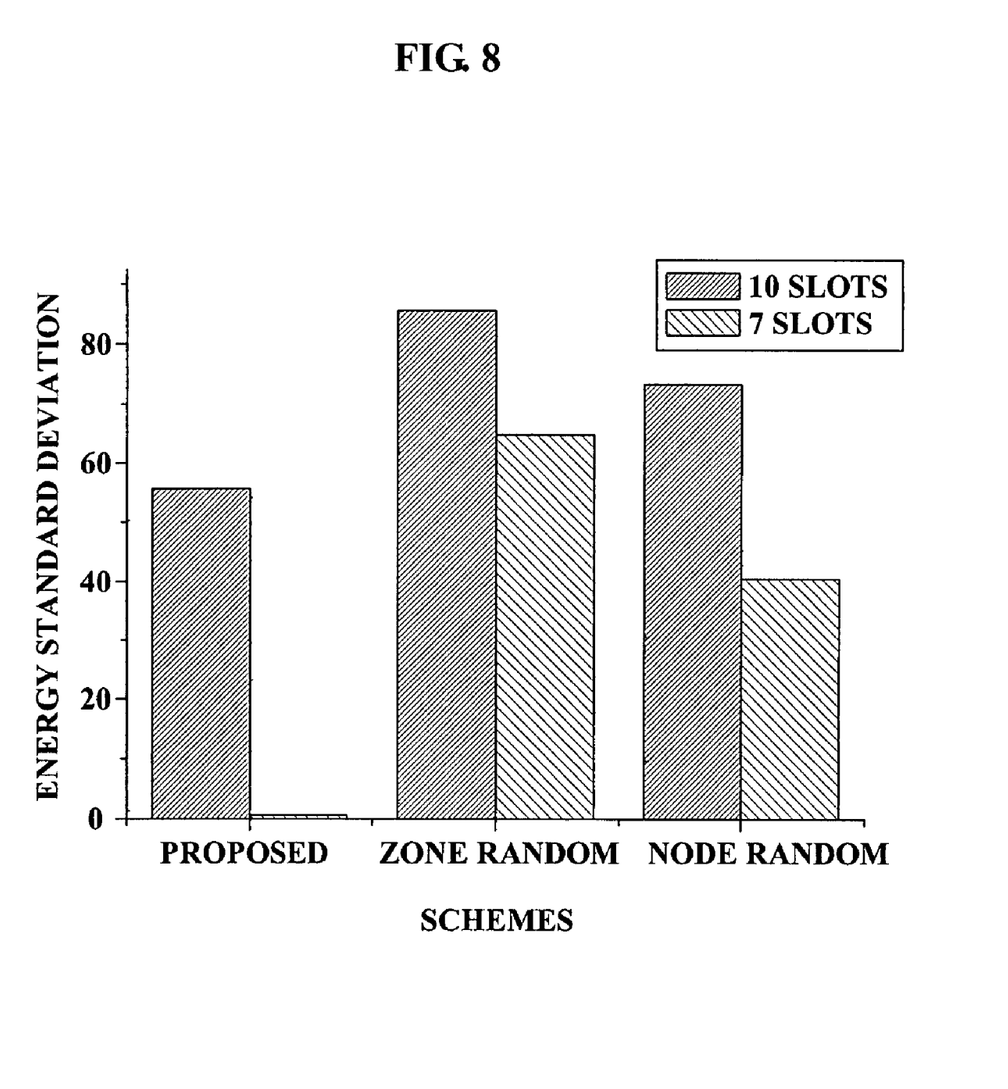
FIG. 8 is a graph illustrating another example of an energy standard deviation of a method and apparatus for allocating a radio resource in a wireless sensor network according to an exemplary embodiment of the present invention.
Figure 9:
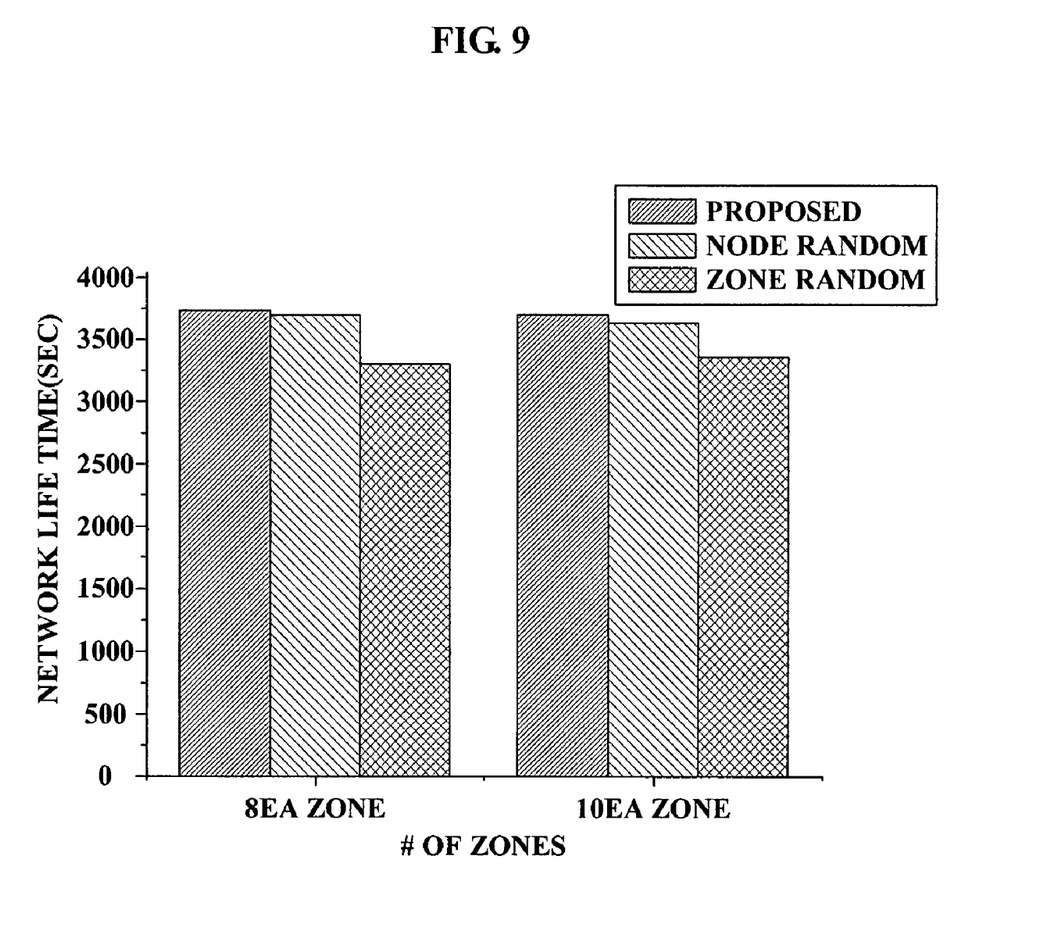
FIG. 9 is a graph illustrating a network lifetime of a method and apparatus for allocating a radio resource in a wireless sensor network according to an exemplary embodiment of the present invention.

FIG. 7 is a graph illustrating an example of an energy standard deviation of a method and apparatus for allocating a radio resource in a wireless sensor network according to an exemplary embodiment of the present invention. FIG. 8 is a graph illustrating another example of an energy standard deviation of a method and apparatus for allocating a radio resource in a wireless sensor network according to an exemplary embodiment of the present invention. FIG. 9 is a graph illustrating a network lifetime of a method and apparatus for allocating a radio resource in a wireless sensor network according to an exemplary embodiment of the present invention. Hereinafter, referring to FIGS. 7, 8, and 9, a result that a lifetime of the wireless sensor network increases is described in detail.

For reference, as described above, to extend the lifetime of the wireless sensor network, at most, a same amount of energy for each sensor should be consumed. Since the amount of the consumed energy is proportional to a number of packets transmitted by each sensor, an amount of energy consumed for each sensor may be computed depending on which sensor collects a particular packet. Also, the computed value may be confirmed by an energy standard deviation value.

Under the above-described assumption, FIG. 7 illustrates a standard deviation of the consumed energy for each sensor. In a zone before the wireless sensor network is saturated, traffic is randomly generated, and a cluster header performs a radio resource allocation for collecting generated data without a particular limit. Accordingly, sensors, included in a zone where the traffic frequently is generated, tend to consume an excessive amount of energy during an experiment time. However, from a point in time when the wireless sensor network is saturated, that is, a point in time when data transmitted by all sensors exists, an effect of the scheme according to an exemplary embodiment of the present invention is proved. As illustrated in FIG. 7, after the point in time when the wireless sensor network is saturated, the energy standard deviation becomes approximately 0. Accordingly, a consumption energy of all sensors becomes identical and thus, the lifetime may be extended.

FIG. 8 illustrates a bar graph showing an energy standard deviation which is confirmed when setting a number of slots of a contention free period as ten and seven in the wireless sensor network. The wireless sensor network includes eight zones. When ten slots exist, a scheme according to an exemplary embodiment of the present invention has a relatively small energy standard deviation. When seven slots exist, the scheme according to an exemplary embodiment of the present invention has an energy standard deviation of approximately 0. Specifically, according to an exemplary embodiment of the present invention, a length of the contention free period is controlled depending on a traffic amount generated in the wireless sensor network. Accordingly, a consumption energy standard deviation of a sensor may be approximately 0. Thus, according to an exemplary embodiment of the present invention, all sensors consume the same amount of energy.

When considering a result in FIG. 7 and a result in FIG. 8 together, a following technological concept may be extracted. When the scheme according to an exemplary embodiment of the present invention is used in a wireless sensor network including eight zones, an amount of consumption energy is identical when seven slots rather than ten slots are allocated as the contention free period. The economized three slots, that is, a number of remaining slots, may be allocated as the inactive period. Specifically, three slots in the inactive period are increased on a frame. Accordingly, additional energy savings of three slots at every frame is expected.

FIG. 9 illustrates a result of comparing a network lifetime of the scheme according to the present invention and a network lifetime of a conventional art, when an initial lifetime of a sensor is set as 2000 J, a number of zones is eight and ten. When the number of zones is eight, a number of slots in a contention free period is seven, and when the number of zones is ten, the number of slots in the contention free period is ten. As illustrated in FIGS. 7 and 8, since an energy standard deviation value according to an exemplary embodiment of the present invention is smaller than an energy standard deviation value of a zone random method and a node random method in a conventional art, the network lifetime according to an exemplary embodiment of the present invention is longest as illustrated in FIG. 9.

Also, according to exemplary embodiments of the present invention, a method and apparatus for allocating a radio resource in a wireless sensor network which may efficiently use a resource, since a great change of a sensor itself or a network system is unnecessary, to extend a lifetime of the wireless sensor network.

According to exemplary embodiments of the present invention, a method and apparatus for allocating a radio resource in a wireless sensor network which may greatly extend a lifetime of the wireless sensor network while maintaining a throughput and data transmission delay of the wireless sensor network. The present invention can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks, optical data storage devices, and carrier waves (such as data transmission through the Internet via wired or wireless transmission paths). The computer-readable recording medium can also be distributed over network-coupled computer systems so that the computer-readable code is stored and executed in a distributed fashion. Also, function programs, codes, and code segments for accomplishing the present invention can be easily construed as within the scope of the invention by programmers skilled in the art to which the present invention pertains.

While the invention has shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method for allocating a radio resource in a wireless sensor network, the method comprising:
   receiving a signal requesting a radio resource allocation from at least one sensor included in the wireless sensor network;
   comparing, first, an amount of remaining energy with respect to each zone where a sensor transmitting the signal is included;
   comparing, second, an amount of remaining energy with respect to each sensor included in the same zone, when sensors which transmit the signal requesting the radio resource allocation are included in the same zone;
   determining, first, an order of zones, from a zone comprising a greatest amount of remaining energy to a zone comprising a least amount of remaining energy, as a result of the first comparison;
   determining, second, an order of sensors from a sensor comprising a greatest amount of remaining energy to a sensor comprising a least amount of remaining energy, as a result of the second comparison when sensors which transmit the signal requesting the radio resource allocation are included in the same zone; and
   allocating a time slot to a sensor of each zone according to the determined order of zones, when transmitting a frame for the radio resource allocation.

2. The method of claim 1, wherein the allocating of the time slot comprises allocating the time slot to the sensors included in the same zone according to the determined order of zones, when the sensors which transmit the signal requesting the radio resource allocation are included in the same zone.

3. The method of claim 1, wherein the allocating of the time slot comprises limitedly allocating the time slot with respect to the sensor which transmits the signal requesting the radio resource allocation.

4. The method of claim 1, wherein the wireless sensor network comprises a wireless sensor network using a centralized media access control (MAC) method.

5. The method of claim 1, wherein the sensor which transmits the signal requesting the radio resource allocation transmits the signal to a cluster header when a particular event occurs.

6. The method of claim 1, wherein the frame comprises a beacon period, a contention period, a contention free period, and an inactive period.

7. An apparatus for allocating a radio resource in a wireless sensor network, the apparatus comprising:
   a receiving unit configured to receive a signal requesting a radio resource allocation from at least one sensor included in the wireless sensor network;
   a comparison unit configured to:
      compare, first, an amount of remaining energy with respect to each zone comprising a sensor which transmits the signal; and
      compare, second, an amount of remaining energy with respect to each sensor included in a same zone, when sensors which transmit the signal requesting the radio resource allocation are included in the same zone;
   a determination unit configured to:
      determine, first, an order of zones, from a zone comprising a greatest amount of remaining energy to a zone comprising a least amount of remaining energy, as a result of the first comparison; and
      determine, second, an order of sensors from a sensor comprising a greatest amount of remaining energy to a sensor comprising a least amount of remaining energy, as a result of the second comparison when sensors which transmit the signal requesting the radio resource allocation are included in the same zone; and
   an allocation unit configured to allocate a time slot to a sensor of each zone according to the determined order of zones, when transmitting a frame for the radio resource allocation.

8. The apparatus of claim 7, wherein the allocation unit is further configured to allocate the time slot to the sensors included in the same zone according to the determined order, when the sensors which transmit the signal requesting the radio resource allocations are included in the same zone.

9. The apparatus of claim 7, wherein the allocation unit is further configured to limitedly allocate the time slot with respect to the sensor which transmits the signal requesting the radio resource allocation.

10. The apparatus of claim 7, wherein the apparatus for allocating the radio resource in the wireless sensor network comprises a cluster header.

11. A method for allocating a radio resource in a wireless sensor network using a centralized media access control (MAC) method, the method comprising:
    comparing, first, an amount of remaining energy with respect to each zone where a sensor transmitting a signal requesting a radio resource allocation from at least one sensor included in the wireless sensor network;
    comparing, second, an amount of remaining energy with respect to each sensor included in the same zone, when sensors transmitting the signal requesting the radio resource allocation are included in the same zone;
    determining, first, an order of zones, from a zone comprising a greatest amount of remaining energy to a zone comprising a least amount of remaining energy, as a result of the first comparison;
    determining, second, an order of sensors from a sensor comprising a greatest amount of remaining energy to a sensor comprising a least amount of remaining energy, as a result of the second comparison when sensors which transmit the signal requesting the radio resource allocation are included in the same zone; and
    allocating a time slot to a sensor of each zone according to the determined order of zones, when transmitting a frame for the radio resource allocation.

12. The method of claim 11, wherein the allocating of the time slot comprises allocating the time slot to the sensors included in the same zone according to the determined order of zones, when the sensors which transmit the signal requesting the radio resource allocation are included in the same zone.

13. The method of claim 11, wherein the allocating of the time slot comprises limitedly allocating the time slot with respect to the sensor which transmits the signal requesting the radio resource allocation.

14. The method of claim 11, wherein the sensor transmitting the signal requesting the radio resource allocation transmits the signal to a cluster header when a particular event occurs.

15. The method of claim 11, wherein the frame comprises a beacon period, a contention period, a contention free period, and an inactive period.

16. A non-transitory computer-readable recording medium storing a computer program code for performing a method for allocating a radio resource in a wireless sensor network, the code comprising executable instructions for:

receiving a signal requesting a radio resource allocation from at least one of sensors included in the wireless sensor network;

comparing, first, an amount of remaining energy with respect to each zone where a sensor transmitting the signal is included;

comparing, second, an amount of remaining energy with respect to each sensor included in the same zone, when sensors which transmit the signal requesting the radio resource allocation are included in the same zone;

determining, first, an order of zones, from a zone comprising a greatest amount of remaining energy to a zone comprising a least amount of remaining energy, as a result of the comparison;

determining, second, an order of sensors from a sensor comprising a greatest amount of remaining energy to a sensor comprising a least amount of remaining energy, as a result of the second comparison when sensors which transmit the signal requesting the radio resource allocation are included in the same zone; and allocating a time slot to a sensor of each zone according to the determined order of zones, when transmitting a frame for the radio resource allocation.

17. The non-transitory computer-readable recording medium of claim 16, wherein the allocating of the time slot comprises allocating the time slot to the sensors included in the same zone according to the determined order of zones, when the sensors which transmit the signal requesting the radio resource allocation are included in the same zone.

18. The non-transitory computer-readable recording medium of claim 16, wherein the allocating of the time slot comprises limitedly allocating the time slot with respect to the sensor which transmits the signal requesting the radio resource allocation.

19. The non-transitory computer-readable recording medium of claim 16, wherein the wireless sensor network comprises a wireless sensor network using a centralized media access control (MAC) method.

20. The non-transitory computer-readable recording medium of claim 16, wherein the sensor which transmits the signal requesting the radio resource allocation transmits the signal to a cluster header when a particular event occurs.

21. The non-transitory computer-readable recording medium of claim 16, wherein the frame comprises a beacon period, a contention period, a contention free period, and an inactive period.

* * * * *